(12) United States Patent
Mott et al.

(10) Patent No.: US 7,797,017 B2
(45) Date of Patent: Sep. 14, 2010

(54) SYSTEM AND METHOD FOR RAPIDLY CONFIGURING WIRELESS TRANSCEIVERS

(75) Inventors: Jordan Charles Mott, Allen, TX (US); William M. Hurley, Murphy, TX (US); John Alexander Interrante, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 795 days.

(21) Appl. No.: 11/682,750

(22) Filed: Mar. 6, 2007

(65) Prior Publication Data

US 2008/0219248 A1    Sep. 11, 2008

(51) Int. Cl.
*H04M 3/00* (2006.01)
*H04M 1/00* (2006.01)
*H04W 24/00* (2009.01)
*H04B 1/38* (2006.01)

(52) U.S. Cl. .............. 455/550.1; 455/418; 455/423; 455/552.1; 455/556.2; 455/557; 455/558

(58) Field of Classification Search ............. 455/68, 455/88, 403, 418–420, 423, 425, 514, 550.1, 455/552.1, 556.1–556.2, 557–559, 66.1; 711/1–5, 101, 147–149, 153–156, 100; 327/365, 327/419, 427, 466; 370/312–313, 334, 363, 370/242, 247, 248, 310; 710/1, 2, 100, 10–12, 710/14, 104–105; 713/1–2, 100
See application file for complete search history.

(56) References Cited

U.S. PATENT DOCUMENTS

| | | | | |
|---|---|---|---|---|
| 5,815,732 A * | 9/1998 | Cooper et al. | ................. | 710/36 |
| 6,329,938 B1 * | 12/2001 | Spaur et al. | ................. | 341/118 |
| 2004/0127207 A1 * | 7/2004 | Stufflet et al. | ............... | 455/418 |
| 2007/0043887 A1 * | 2/2007 | Wang et al. | ................... | 710/62 |
| 2008/0205161 A1 * | 8/2008 | Kang | ................... | 365/185.23 |

* cited by examiner

*Primary Examiner*—Meless N Zewdu

(57) ABSTRACT

A system and method for configuring a wireless transceiver are disclosed. As one example, a system for configuring a wireless transceiver is disclosed, which includes a first data storage unit coupled to a configuration bus disposed in the wireless transceiver, a second data storage unit coupled to the configuration bus, a change detection unit coupled to the second data storage unit, the change detection configured to detect a change to a value stored in the second data storage unit, and output a signal responsive to the change, and a third data storage unit coupled to the first data storage unit, the second data storage unit, and the change detection unit. The third data storage unit is configured to store a plurality of predefined configuration data sets, and convey a predefined configuration data set to the first data storage unit responsive to the signal.

20 Claims, 2 Drawing Sheets

US 7,797,017 B2

SYSTEM AND METHOD FOR RAPIDLY CONFIGURING WIRELESS TRANSCEIVERS

FIELD OF THE INVENTION

The invention relates to the telecommunications field, and more particularly, but not exclusively, to a system and method for rapidly configuring wireless transceivers, such as, for example, multi-standard wireless transceivers.

BACKGROUND OF THE INVENTION

The development of reprogrammable radio transceivers, which can be operated in accordance with multiple standards, is an important goal being pursued by the wireless communications industry. Reprogrammable radio transceivers are expected to provide a relatively inexpensive way to produce flexible handsets that can be reconfigured for use in any wireless network without having to change the hardware platforms involved. The ability to achieve this development goal would enable a successful company to drive up its handset production volumes, and drive down its production costs. However, the industry also recognizes that the hardware that accompanies such multi-standard transceivers will have to be capable of accommodating the broad level of programmability required, but changes to the existing software, hardware, and the associated costs will have to be minimized.

In this regard, a significant problem that exists in the design of reprogrammable radio transceivers is that the processes currently used to configure Digital Signal Processor- (DSP-) related digital hardware are extremely time- and resource-consuming, because of the relatively large number of configuration registers involved. For example, the number of registers involved in programming a relatively complicated DSP component (e.g., digital filter pipeline) can be on the order of 100s of registers. Also, the time required to individually program all the registers in a digital filter pipeline (e.g., using typical serial interfaces) can take up to 100 msecs for each 100 registers in the set. Furthermore, the use of multiple register sets to hold N configurations will require N times the number of registers, which will result in substantially longer device boot-up times and more die area.

Unfortunately, the typical software timing budgets currently available for existing analog, single standard transceiver front-end solutions provide only enough time to configure between 3 to 10 DSP-related registers. However, the exceptionally large number (e.g., 100s) of registers that are expected to be used in future reprogrammable radio transceivers will require new design solutions in order to limit power consumption, minimize the impact on existing Radio Frequency (RF) drivers, reduce the number of hardware resources to be used, and create a suitable balance between transceiver programmability and design flexibility.

SUMMARY OF THE INVENTION

In a first example embodiment, a system for configuring a wireless transceiver is provided. The system includes a first data storage unit coupled to a configuration bus disposed in the wireless transceiver, a second data storage unit coupled to the configuration bus, a change detection unit coupled to the second data storage unit, the change detection configured to detect a change to a value stored in the second data storage unit, and output a signal responsive to the change, and a third data storage unit coupled to the first data storage unit, the second data storage unit, and the change detection unit. The third data storage unit is configured to store a plurality of predefined configuration data sets, and convey a predefined configuration data set to the first data storage unit responsive to the signal.

In a second example embodiment, an apparatus for configuring a wireless transceiver is provided. The apparatus includes a configuration bus interface unit, a first plurality of control registers coupled to the configuration bus interface unit, a second plurality of control registers coupled to the configuration bus interface unit, a configuration control unit coupled to the first plurality of control registers and the second plurality of control registers, a first plurality of configuration registers coupled to the configuration control unit, a second plurality of configuration registers coupled to the configuration control unit, at least one switching unit coupled to the first plurality of configuration registers and the second plurality of configuration registers, a first processing unit coupled to the at least one switching unit, and a second processing unit coupled to the at least one switching unit. The configuration control unit is configured to enable the at least one switching unit to couple configuration data from an output of at least one of the first plurality of configuration registers and the second plurality of configuration registers to an input of at least one of the first processing unit and the second processing unit.

In a third example embodiment, a method for configuring a wireless transceiver is provided. The method includes the steps of receiving a configuration bus cycle, extracting configuration mode data from the configuration bus cycle, storing the configuration mode data in at least one control register of a plurality of control registers, determining if the stored configuration mode data has changed to new configuration mode data, and if the stored configuration mode data has changed to new configuration mode data, conveying a predefined set of configuration data to at least one set of configuration registers of the wireless transceiver, the predefined set of configuration data associated with the new configuration mode data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
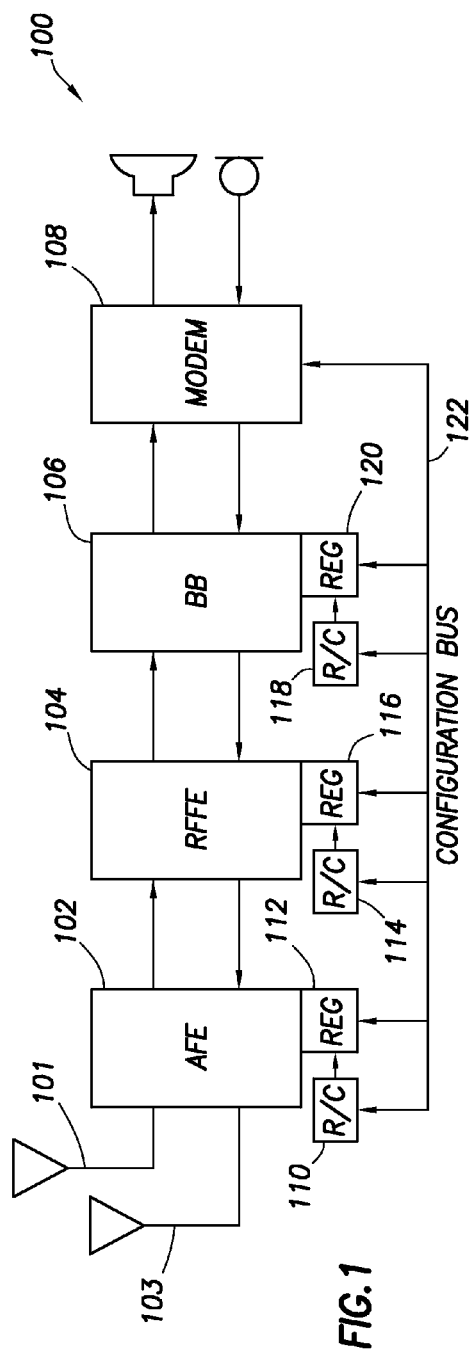
FIG. 1 depicts a block diagram of a system for rapidly configuring a wireless transceiver, which can be used to implement a first example embodiment of the present invention.

With reference now to the figures, FIG. 1 depicts a block diagram of a system 100 for rapidly configuring a wireless transceiver, which can be used to implement a first example embodiment of the present invention. For example, system 100 can be implemented as all or part of a software-defined wireless transceiver or radio, which can be incorporated into an RF Integrated Circuit (RFIC) chip, Application-Specific IC (ASIC), or any other suitable IC, chip or semiconductor device. For this example embodiment, system 100 is a multi-standard wireless transceiver system, which includes an analog front end (AFE) unit 102, an RFFE unit 104, a baseband (BB) unit 106, and a modem unit 108. The AFE unit 102 may include, for example, a duplexer and a switchplexer, which can be used to couple incoming signals from a receive antenna 101 to a plurality of low noise amplifiers, and also couple outgoing signals from a plurality of power amplifiers to a transmit antenna 103.

For this example embodiment, the RFFE unit 104 is coupled to the AFE unit 102. The RFFE unit 104 may include on the receive side, for example, a down-converter to convert the received RF signal to a suitable intermediate frequency (IF) signal, an adjustable gain voltage-controlled amplifier (VCA) to control the gain of the down-converted signal, a bandpass filter to filter the down-converted signal, and an analog-to-digital (A/D) converter to convert the down-converted analog IF signal to a suitable digital IF signal. On the transmit side, the RFFE unit 104 may include, for example, a digital-to-analog (D/A) converter to convert a digital IF signal to a suitable analog IF signal, an up-converter to convert the analog IF signal to an analog RF signal, a demultiplexer to couple the analog RF signal to an RF filter of a plurality of RF filters, and a plurality of power amplifiers to amplify the RF signals to be transmitted. The RF signal output from each power amplifier in the RFFE unit 104 is coupled to the duplexer and switchplexer in the AFE unit 102 for transmission via the transmit antenna 103.

For this example embodiment, the BB unit 106 is coupled to the RFFE unit 104 and the modem unit 108. The BB unit 106 may include, for example, suitable DSP components to down-convert the digital IF signal from the RFFE unit 104 to a suitable BB signal, which can be coupled to the modem unit 108 on the receive side. On the transmit side, the BB unit 106 may include, for example, suitable DSP components to up-convert a digital BB signal from the modem unit 108 to a suitable digital IF signal.

The modem unit 108 operates along with the AFE unit 102, the RFFE unit 104, and the BB unit 106 to transmit and receive encoded analog or digital signals to or from sources in a ubiquitous wireless environment and the transceiver system 100 involved. In order to operate as a multi-standard transceiver, each configurable unit 102, 104 and 106 in transceiver system 100 includes a suitable number of configuration registers that can be reconfigured. For example, AFE unit 102 includes a plurality of associated configuration registers 112 coupled to a configuration bus 122, RFFE unit 104 includes a plurality of associated configuration registers 116 coupled to the configuration bus 122, and BB unit 106 includes a plurality of associated configuration registers 120 also coupled to the configuration bus 122. Thus, the configuration bus 122 can be used to transfer configuration information between the modem unit 108 and each of the configuration register sets 112, 116 and 120. Consequently, the modem unit 108 can control the configurations of each of the AFE unit 102, RFFE unit 104, and BB unit 106, by conveying suitable configuration information to the associated configuration register set 112, 116, 120 involved.

Notably, as described above, each sub-system or unit 102, 104, 106 in the multi-standard transceiver system 100 has a set of associated configuration registers 112, 116, 120 that can be reconfigured. However, the BB unit 106 can include a substantially large number of digital filter elements, which requires the use of a much larger number of configuration registers than the other units in system 100. Each such filter element can require numerous different settings to enable the transceiver system 100 to operate, for example, in accordance with a plurality of different wireless network standards, on different frequency bands, and/or with different sampling rates. The modem unit 108 is capable of programming these filter elements by conveying suitable configuration information via the configuration bus 122 to the configuration register set involved. However, the ability to rapidly change the transceiver unit's configurations from one standard to another, enable new communication links, measure the signal strengths of compatible networks, and enable new sampling rates to support broader bandwidths for downloading or uploading data, requires an extensive use of the configuration bus 122 to reconfigure the BB unit 106 in accordance with the changed mode. However, the extensive use of the configuration bus 122 to perform such reconfigurations directly can unnecessarily tie up the configuration bus, and consequently, require a relatively long time to complete for typical bandwidths on the configuration bus. Nevertheless, the exemplary embodiment of transceiver system 100 resolves this reconfiguration resource problem with a minimum of resources.

Notably, for this example embodiment, transceiver system 100 includes a plurality of rapid configuration units 110, 114 and 118 coupled to the configuration bus 122. The modem unit 108 can convey suitable configuration information to each of the rapid configuration units 110, 114 and 118 via the configuration bus 122. Each rapid configuration unit 110, 114, 118 is associated with, and coupled to, a respective configuration register set 112, 116, 120. Importantly, as described below with respect to FIG. 2, the modem unit 108 can be used to control the reconfigurations of each of the AFE unit 102, RFFE unit 104, and BB unit 106 (e.g., rapidly, on-the-fly, adaptively, post-production, real-time, etc.), without unnecessarily tying up the configuration bus 122.

Figure 2:
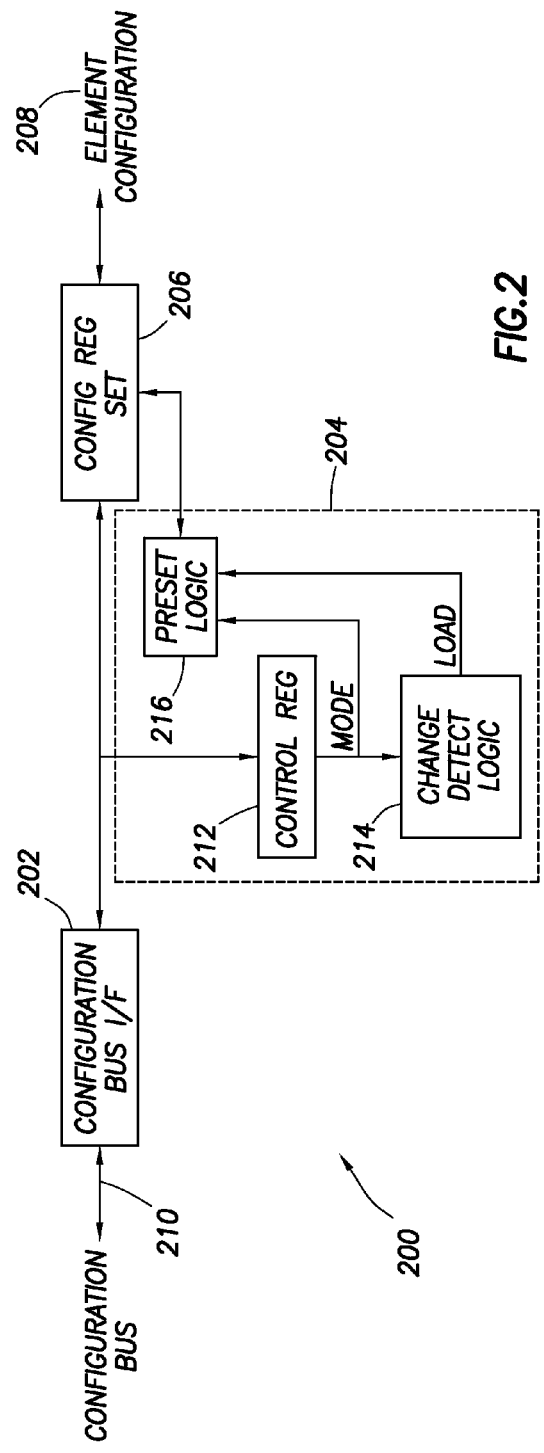
FIG. 2 depicts a block diagram of an example apparatus for rapidly configuring a wireless transceiver, which can be used, for example, to implement the rapid configuration units and configuration register sets shown in the exemplary embodiment of FIG. 1.

FIG. 2 depicts a block diagram of an example apparatus 200 for rapidly configuring a wireless transceiver, which can be used, for example, to implement the rapid configuration units 110, 114, 118 and configuration register sets 112, 116, 120 shown in the exemplary embodiment of FIG. 1. For this example embodiment, apparatus 200 includes a configuration bus interface 202 coupled to a configuration register set 206 and a control register 212 in a rapid configuration unit 204. The configuration bus interface 202 is also coupled to a configuration bus 210, and the configuration bus 210 is coupled to a modem (not shown). The configuration register set 206 is also coupled to a programmable element 208 to be reconfigured in the multi-standard transceiver system involved. As one example, the programmable element 208 to be reconfigured can represent BB unit 106 in FIG. 1, the configuration register set 206 can represent configuration register set 120, the rapid configuration unit 204 can represent rapid configuration unit 118, and the configuration bus 210 can represent configuration bus 122. As a second example, the element 208 to be reconfigured can represent AFE unit 102 in FIG. 1, the configuration register set 206 can represent configuration register set 112, and the rapid configuration unit 204 can represent rapid configuration unit 110. As a third example, the element 208 to be reconfigured can represent RFFE unit 104 in FIG. 1, the configuration register set 206 can represent configuration register set 116, and the rapid configuration unit 204 can represent rapid configuration unit 114. In other words, the programmable element 208 to be reconfigured can represent any reprogrammable component of the wireless transceiver involved.

For this example embodiment, the rapid configuration unit 204 in FIG. 2 also includes change detect logic circuitry 214 coupled to the control register set 212. The change detect logic circuitry 214 is also coupled to an input of preset logic circuitry 216. A second input of preset logic circuitry 216 is coupled to an output of the control register set 212, and the preset logic circuitry 216 is also coupled to the configuration register set 206.

Assume, for illustrative purposes, that in this example embodiment, the programmable element 208 to be reconfigured is BB unit 106 depicted in FIG. 1. Also assume that the BB unit's digital filter has numerous configuration registers that can control the filter's processing and data path elements. Additionally, the BB unit 106 may include other configurable elements that can provide certain functions, such as, for example, different gain settings, different dc offset settings, and other signal processing compensation functions. As described in detail below, the rapid configuration unit 204 can load all of these configurable elements with any one of a number of different pre-defined configurations, during a single configuration bus cycle. As a result, the rapid configuration unit 204 can significantly reduce (e.g., by 100s) the number of configuration bus cycles needed to reconfigure the BB unit's components, which minimizes the processing resources required by the multi-standard transceiver, and also allows maximum design flexibility if such configuration changes are required.

Specifically, for this example embodiment, the configuration bus interface 202 functions primarily as a termination device, which terminates the configuration bus cycles initiated by the transceiver's modem and also provides access to the register set of the BB unit's filter components (and other configurable components, if desired). That register set can include one or more registers set aside as the control register set 212, and one or more other registers set aside as the configuration register set 206. Advantageously, with this configuration, the example embodiment depicted in FIG. 2 can provide two types of configuration bus cycles: (1) a direct access configuration bus cycle; and (2) a rapid configuration bus cycle.

For this example embodiment, the direct access configuration bus cycle is a modem-initiated cycle, wherein the contents of a specific register of the configuration register set 206 within the multi-standard transceiver's unit (e.g., BB unit 106 in this example) are directly accessed by the modem involved. The modem can directly access the intended configuration register(s) of the register set 206 via the configuration bus 210 and the configuration bus interface 202.

For this example embodiment, the rapid configuration bus cycle can be initiated by a modem with a direct access configuration bus cycle that accesses one or more register(s) of the control register set 212 in the rapid configuration unit 204. In this case, the modem initiates the rapid configuration bus cycle with the intention of changing one or more rapid configuration mode bits within the control register(s) 212 involved, but not directly access the contents of the configuration register set. Once the modem has changed the rapid configuration mode bit(s) in the control register(s) involved, the new mode bits are detected and/or recognized by the change detect logic circuitry 214, which in response, generates and outputs a load pulse or other suitable signal. The output mode change bits and load pulse are coupled to respective inputs of the preset logic circuitry 216. The preset logic circuitry 216 contains a plurality of predefined sets of configuration data.

In response to receiving the mode change bits from the control register set 212, and load pulse from the change detect logic circuitry 214, the preset logic circuitry 216 outputs a specific set of predefined configuration data that corresponds to the specific mode change bit pattern received. This set of predefined configuration data (e.g., stored during the manufacturing process) from the preset logic circuitry 216 is loaded into each intended register in the configuration register set 206. Thus, in order for the modem to reconfigure the transceiver system to operate in accordance with a different standard, within a different frequency band, and/or with a different sampling rate, the modem can access the programmable unit's associated control register set, and all of the pertinent configuration registers within the transceiver's programmable unit can be configured in accordance with the predefined configuration data from the preset logic circuitry 216. Notably, in those situations in which the transceiver system is required to operate in a particular operating mode that requires a deviation from the configuration defined by the data in the preset logic circuitry 216, the modem can use one or more direct access configuration bus cycles to modify the pertinent configuration registers' contents directly with the required configuration values.

Figure 3:
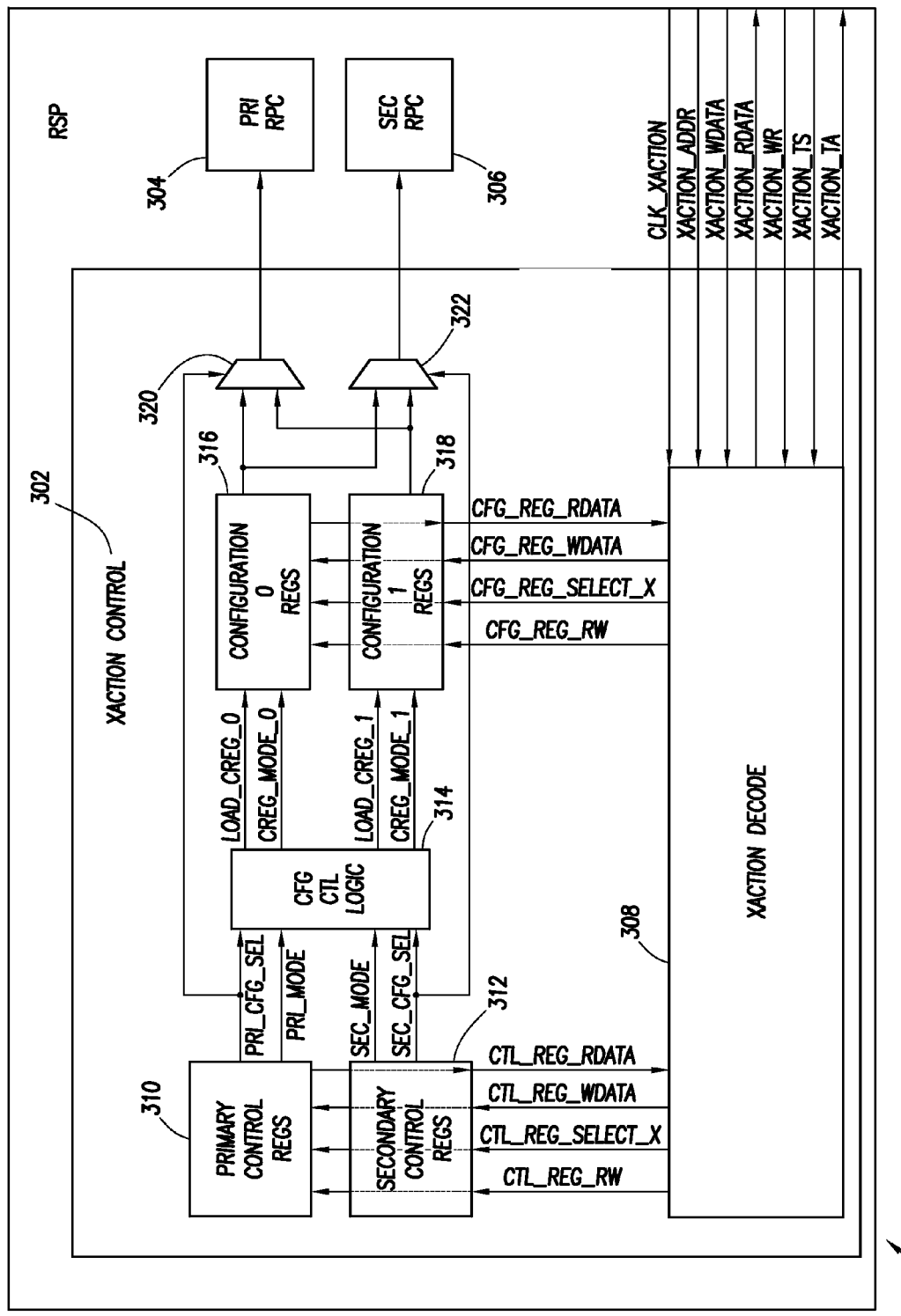
FIG. 3 depicts a block diagram of an example apparatus for rapidly configuring a wireless transceiver, which can be used to implement a second example embodiment of the present invention.

FIG. 3 depicts a block diagram of an example apparatus 300 for rapidly configuring a wireless transceiver, which can be used to implement a second example embodiment of the present invention. For example, apparatus 300 may be used to implement one or more of the rapid configuration units 110, 114, 118 and associated configuration register sets 112, 116, 120 of the example embodiment depicted in FIG. 1.

For this example embodiment, apparatus 300 includes a transaction (XACTION) control unit 302, a primary Receive Processor Core (RPC) unit 304, and a secondary RPC unit 306. The XACTION control unit 302 includes a XACTION decode unit 308, which functions primarily to decode data in transaction type bus cycles. For example, a transaction type bus cycle can be characterized by a parallel address/data bus configuration using handshake type signals that validate and control the data being transferred across the bus. For example, the XACTION decode unit 308 is representative of the configuration bus interface implied by element 122 shown in FIG. 1, or the combination of configuration bus 210 and configuration bus interface 202 shown in FIG. 2.

The XACTION decode unit 308 functions primarily to terminate the transaction bus cycles received, and route the data/information contained in the transaction bus cycles to one of the register sets shown. For example, the XACTION decode unit 308 can route the information/data contained in the transaction bus cycles to one of the primary control registers 310 or secondary control registers 312, or to one of the sets of configuration registers (0) 316 or configuration registers (1) 318. Thus, using transaction type bus cycles, a modem can write or read to or from either of the primary or secondary control registers 310, 312, or to or from either of the configuration register sets 316, 318.

For this example embodiment, the primary and secondary control registers 310, 312 function to control unique configuration variables that may be forwarded to either the primary RPC unit 304 or secondary RPC unit 306. Each of the primary and secondary control registers 310, 312 contains suitable information/data that defines the processing mode for the particular RPC unit 304 or 306 involved. In other words, the data contained in the primary control registers 310 can be used to define the data processing mode of the primary RPC unit 304, and the data contained in the secondary control registers 312 can be used to define the data processing mode of the secondary RPC unit 306. Thus, a modem can accomplish a relatively rapid processing mode change for the primary RPC unit 304 or the secondary RPC unit 306, by modifying the mode bits contained in the respective primary control registers 310 or secondary control registers 312.

For this example embodiment, each of the processing modes defined for the primary RPC unit 304 and secondary RPC unit 306 can be related to a particular frequency, bandwidth, and/or sampling rate required to operate the transceiver in accordance with the specific radio air interface standard involved. Thus, in accordance with the rapid configuration features provided by the present invention, the processing modes defined for the primary RPC unit 304 and secondary RPC unit 306 can be used to initialize all of the registers in the selected configuration register set 316 or 318. As such, each control register set 310, 312 may contain other signals which are specific to the digital pipeline being controlled.

For this example embodiment and simplicity of design, the two sets of configuration registers 316, 318 can be implemented as identical sets of registers, which can contain all of the control variables/data needed to suitably configure each RPC 304, 306 in accordance with a predefined data processing mode. For example, each predefined data processing mode can be related to a specific frequency or bandwidth associated with a particular radio air interface protocol or other wireless communication standard or protocol. As such, the registers in each of the configuration register sets 316, 318 may be initialized in two ways. For example, the registers in the configuration register sets may be initialized by direct modem access via the XACTION bus (e.g., decode unit 308). More importantly, using a rapid configuration approach, the registers in the configuration register sets 316, 318 may be initialized by having the modem modify the processing mode bits contained in the primary and secondary control registers 310, 312.

Processing mode information and configuration register select information can be output from one or both of the primary and secondary control registers 310, 312 and coupled to a decision-making configuration control logic unit 314. In one example embodiment, the configuration control logic unit 314 may be implemented with a Finite State Machine (FSM). The configuration control logic unit 314 can detect any change in the processing mode and configuration register set 316, 318 selected, and in response, output a load pulse and new processing mode information/data to one or both of the configuration register sets 316, 318.

For this example embodiment, the configuration control logic unit 314 (e.g., in response to detecting new mode and/or new configuration register selection information) can decide when to output a load pulse to one or both of the configuration register sets 316, 318. Thus, when the configuration control logic unit 314 determines that a configuration register set change or processing mode change is to be initiated, the configuration control logic unit 314 outputs a new mode signal and load pulse to the intended configuration register set 316 or 318. However, if the configuration control logic unit 314 determines that both RPCs 304, 306 are using the same configuration register set 316 or 318, the configuration control logic unit 314 will not allow a mode change to occur unless both control registers 310, 312 are in agreement about the mode to be used. This design feature, which is not intended to limit the scope of the present invention, is provided to prevent oscillations from occurring in the register settings.

Apparatus 300 also includes a first selection unit 320 and second selection unit 322. The output of the first selection unit 320 is coupled to an input of the primary RPC 304, and the output of the second selection unit 322 is coupled to an input of the secondary RPC 306. The output of each configuration register set 316, 318 is coupled to a respective input of each selection unit 320, 322. Also, a selection output of the primary control registers 310 is coupled to an enable input of the first selection unit 320, and a selection output of the secondary control registers 312 is coupled to an enable input of the second selection unit 322. For this example embodiment, each selection unit 320, 322 may be implemented with a multiplexer or similar type of data/signal switching device.

The primary functions of the selection units 320, 322 are to enable each of the primary RPC 304 and secondary RPC 306 to receive configuration data from either the first configuration register set 316 or the second configuration register set 318. The primary control registers 310 enable the first selection unit 320 to output the selected configuration data to the primary RPC 304, and the secondary control registers 312 enable the second selection unit 322 to output the selected configuration data to the secondary RPC 306.

In summary, the present invention provides an approach for rapidly configuring a wireless transceiver that minimizes the use of the configuration bus, provides the flexibility needed to institute new standards or engineering updates, and accomplishes these functions with a minimum of processing resources. As such, the present invention provides an approach that allows the timing cycles defined for existing RF drivers to be carried forward into the multi-standard architectures envisioned for the future, without the need for major RF timing modifications. This approach will reduce the number of CPU cycles required to accomplish inter-network handoffs, provide compressed cycles, and will enable/disable new design features that will reduce transceiver power consumption and extend battery life.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for configuring a wireless transceiver, comprising:
   a first data storage unit coupled to a configuration bus disposed in the wireless transceiver;
   a second data storage unit coupled to the configuration bus;
   a change detection unit coupled to the second data storage unit, the change detection configured to detect a change to a value stored in the second data storage unit, and output a signal responsive to the change; and
   a third data storage unit coupled to the first data storage unit, the second data storage unit, and the change detection unit, the third data storage unit configured to store a plurality of predefined configuration data sets, and convey a predefined configuration data set to the first data storage unit responsive to the output signal.

2. The system of claim 1, wherein the first data storage unit comprises a plurality of configuration registers.

3. The system of claim 1, wherein the second data storage unit comprises at least one contra I register.

4. The system of claim 1, wherein the third data storage unit comprises a preset logic circuit.

5. The system of claim 1, wherein the change detection unit comprises a change detection logic circuit.

6. The system of claim 1, wherein the signal comprises a load pulse.

7. The system of claim 1, wherein the value stored in the second data storage unit comprises a bit pattern representing a processing mode.

8. The system of claim 1, further comprising a configuration bus interface coupled to the configuration bus, the first data storage unit and the second data storage unit, the configuration bus interface configured to terminate a plurality of transaction bus cycles.

9. The system of claim 1, wherein at least a portion of the wireless transceiver is disposed in an integrated circuit.

10. An apparatus for configuring a wireless transceiver, comprising:
    a configuration bus interface unit;
    a first plurality of control registers coupled to the configuration bus interface unit;
    a second plurality of control registers coupled to the configuration bus interface unit;
    a configuration control unit coupled to the first plurality of control registers and the second plurality of control registers;
    a first plurality of configuration registers coupled to the configuration control unit;
    a second plurality of configuration registers coupled to the configuration control unit;
    at least one switching unit coupled to the first plurality of configuration registers and the second plurality of configuration registers;
    a first processing unit coupled to the at least one switching unit; and
    a second processing unit coupled to the at least one switching unit, wherein at least one of the first plurality of control registers and second plurality of control registers is configured to enable the at least one switching unit to couple configuration data from an output of at least one of the first plurality of configuration registers and second plurality of configuration registers to an input of at least one of the first processing unit and second processing unit.

11. The apparatus of claim 10, wherein the configuration bus interface unit comprises a transaction decode unit.

12. The apparatus of claim 10, wherein the configuration control unit comprises a finite state machine.

13. The apparatus of claim 10, wherein the at least one switching unit further comprises a first switching unit and a second switching unit, and the first plurality of control registers and the second plurality of control registers are configured to enable the first switching unit or the second switching unit to couple configuration data from an output of the first plurality of configuration registers or the second plurality of configuration registers to an input of the first processing unit or the second processing unit.

14. The apparatus of claim 10, wherein the apparatus and the wireless transceiver are disposed in a radio frequency integrated circuit (RFIC).

15. A method for configuring a wireless transceiver, comprising the steps of:
    receiving a configuration bus cycle by a control unit in the wireless transceiver;
    extracting configuration mode data from the configuration bus cycle;
    storing the configuration mode data in at least one control register of a plurality of control registers;
    determining when the stored configuration mode data has changed to new configuration mode data; and
    when the stored configuration mode data has changed to new configuration mode data, conveying a predefined set of configuration data to at least one configuration register of the wireless transceiver, the predefined set of configuration data associated with the new configuration mode data.

16. The method of claim 15, wherein the receiving, extracting and storing steps are performed by a transaction decode unit of the control unit.

17. The method of claim 15, wherein the determining step is performed by a finite state machine of the control unit.

18. The method of claim 15, wherein the conveying step is performed by a control register and at least one switching unit.

19. The method of claim 18, wherein the at least one switching unit further comprises a first switching unit and a second switching unit of the control unit, and a first set of the plurality of control registers and a second set of the plurality of control registers are configured to enable the first switching unit or the second switching unit to couple configuration data from an output of the first set of the plurality of configuration registers or the second set of the plurality of configuration registers to an input of the first processing unit or the second processing unit.

20. The method of claim 15, wherein at least a portion of the wireless transceiver is disposed in an integrated circuit.

* * * * *